(12) United States Patent
McErlean

(10) Patent No.: US 9,922,553 B2
(45) Date of Patent: Mar. 20, 2018

(54) VEHICLE ASSISTANCE SYSTEMS AND METHODS UTILIZING VEHICLE TO VEHICLE COMMUNICATIONS

(71) Applicant: Intel Corporation, Santa Clara, CA (US)

(72) Inventor: Donal McErlean, Shannon (IE)

(73) Assignee: Intel Corporation, Santa Clara, CA (US)

(*) Notice: Subject to any disclaimer, the term of this patent is extended or adjusted under 35 U.S.C. 154(b) by 68 days.

(21) Appl. No.: 14/978,203

(22) Filed: Dec. 22, 2015

(65) Prior Publication Data

US 2017/0178498 A1    Jun. 22, 2017

(51) Int. Cl.
| | | |
|---|---|---|
| *G08G 1/01* | (2006.01) | |
| *B60K 31/00* | (2006.01) | |
| *B60R 1/00* | (2006.01) | |
| *B60K 35/00* | (2006.01) | |

(52) U.S. Cl.
CPC ............ *G08G 1/0112* (2013.01); *B60K 35/00* (2013.01); *B60R 1/00* (2013.01); *B60R 2300/802* (2013.01)

(58) Field of Classification Search
CPC ... G08G 1/0112; B60R 1/00; B60R 2300/802; B60K 35/00
USPC ...................................................... 701/1, 36
See application file for complete search history.

(56) References Cited

U.S. PATENT DOCUMENTS

| | | | | |
|---|---|---|---|---|
| 7,994,902 | B2* | 8/2011 | Avery | G08G 1/161 340/435 |
| 8,352,112 | B2* | 1/2013 | Mudalige | G08G 1/163 340/435 |
| 9,117,371 | B2* | 8/2015 | Hutchings | G08G 1/096791 |
| 9,165,470 | B2* | 10/2015 | Mudalige | G08G 1/22 |
| 9,355,423 | B1* | 5/2016 | Slusar | G06Q 40/08 |
| 9,406,177 | B2* | 8/2016 | Attard | G07C 5/008 |
| 9,505,405 | B2* | 11/2016 | Stanek | B60W 30/09 |
| 9,522,598 | B2* | 12/2016 | Akula | B60K 35/00 |
| 2010/0214085 | A1* | 8/2010 | Avery | G08G 1/161 340/435 |
| 2010/0256836 | A1* | 10/2010 | Mudalige | G08G 1/163 701/2 |
| 2013/0030606 | A1* | 1/2013 | Mudalige | G08G 1/22 701/2 |
| 2013/0342333 | A1* | 12/2013 | Hutchings | G08G 1/096791 340/435 |

(Continued)

*Primary Examiner* — Jaime Figueroa
(74) *Attorney, Agent, or Firm* — Schwabe, Williamson & Wyatt, P.C.

(57) ABSTRACT

Methods, systems, and storage media are described for assisting the operation of a first vehicle. In embodiments, a computing device of the first vehicle may obtain first sensor data from a first sensor of the first vehicle. The first sensor data may be representative of a second vehicle proximate to the first vehicle. The computing device may determine a first position of the second vehicle relative to the first vehicle; initiate a vehicle-to-vehicle (V2V) communications session with the second vehicle; receive second sensor data from the second vehicle during the V2V communications session; and determine a second position based on the second sensor data. The second position may be a position of the second vehicle relative to a third vehicle. The computing device may display an image of the third vehicle on a display device. Other embodiments may be described and/or claimed.

26 Claims, 6 Drawing Sheets

(56) References Cited

U.S. PATENT DOCUMENTS

| | | | | |
|---|---|---|---|---|
| 2015/0178998 A1* | 6/2015 | Attard | ............... | G07C 5/0808 |
| | | | | 701/23 |
| 2015/0246672 A1* | 9/2015 | Pilutti | ............... | B60W 30/00 |
| | | | | 701/2 |
| 2015/0274162 A1* | 10/2015 | Sato | ............... | B60W 10/04 |
| | | | | 701/23 |
| 2016/0071418 A1* | 3/2016 | Oshida | ............... | G08G 1/22 |
| | | | | 701/23 |
| 2016/0207530 A1* | 7/2016 | Stanek | ............... | B60W 30/09 |
| 2016/0303969 A1* | 10/2016 | Akula | ............... | B60K 35/00 |
| 2017/0076599 A1* | 3/2017 | Gupta | ............... | B60Q 9/00 |
| 2017/0105104 A1* | 4/2017 | Ulmansky | ............... | H04W 4/22 |

* cited by examiner

VEHICLE ASSISTANCE SYSTEMS AND METHODS UTILIZING VEHICLE TO VEHICLE COMMUNICATIONS

FIELD

The present disclosure relates to the fields of vehicle automation and/or assistance, and in particular, to apparatuses, methods and storage media associated with assisting operators of vehicles using sensors and wireless communications, and leveraging on proximate vehicles and vehicle-to-vehicle communications.

BACKGROUND

Vehicle-to-everything (V2X) communications includes devices and systems that allow vehicles to communicate with other vehicles (vehicle-to-vehicle (V2V) communications), infrastructure (vehicle-to-infrastructure (V2I) communications), and/or pedestrians (vehicle-to-pedestrian (V2P) communications). Intelligent Transportation Systems (ITS) sometimes utilize V2X systems to manage traffic flow, lane occupancy, toll collection, tracking freight, providing road condition alerts, and the like. Most ITS applications rely on the concept of situation or co-operative awareness, which is based on periodic and event-driven broadcast of basic safety messages (BSM) between vehicles. BSMs are relatively short messages that may be communicated within relatively short intervals. The BSMs may be useful for identifying and notifying vehicle operators of situations that may require vehicle operator action, for example, collision warnings, emergency warnings, pre-crash warnings, traffic warnings, and the like.

Moreover, some vehicles may employ in-car camera systems and/or advanced driver assistance systems (ADAS)-equipped vehicles. ADAS employ devices such as radar sensors and cameras, to detect objects immediately around a vehicle to about 200 meters. Such camera systems may include one or more cameras mounted in or on various locations of a vehicle, wherein each camera may provide corresponding video data to the vehicle operator to assist the vehicle operator in operating the vehicle. However, these camera systems are typically limited by the field of view of each camera, which may be blocked by other objects during operation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
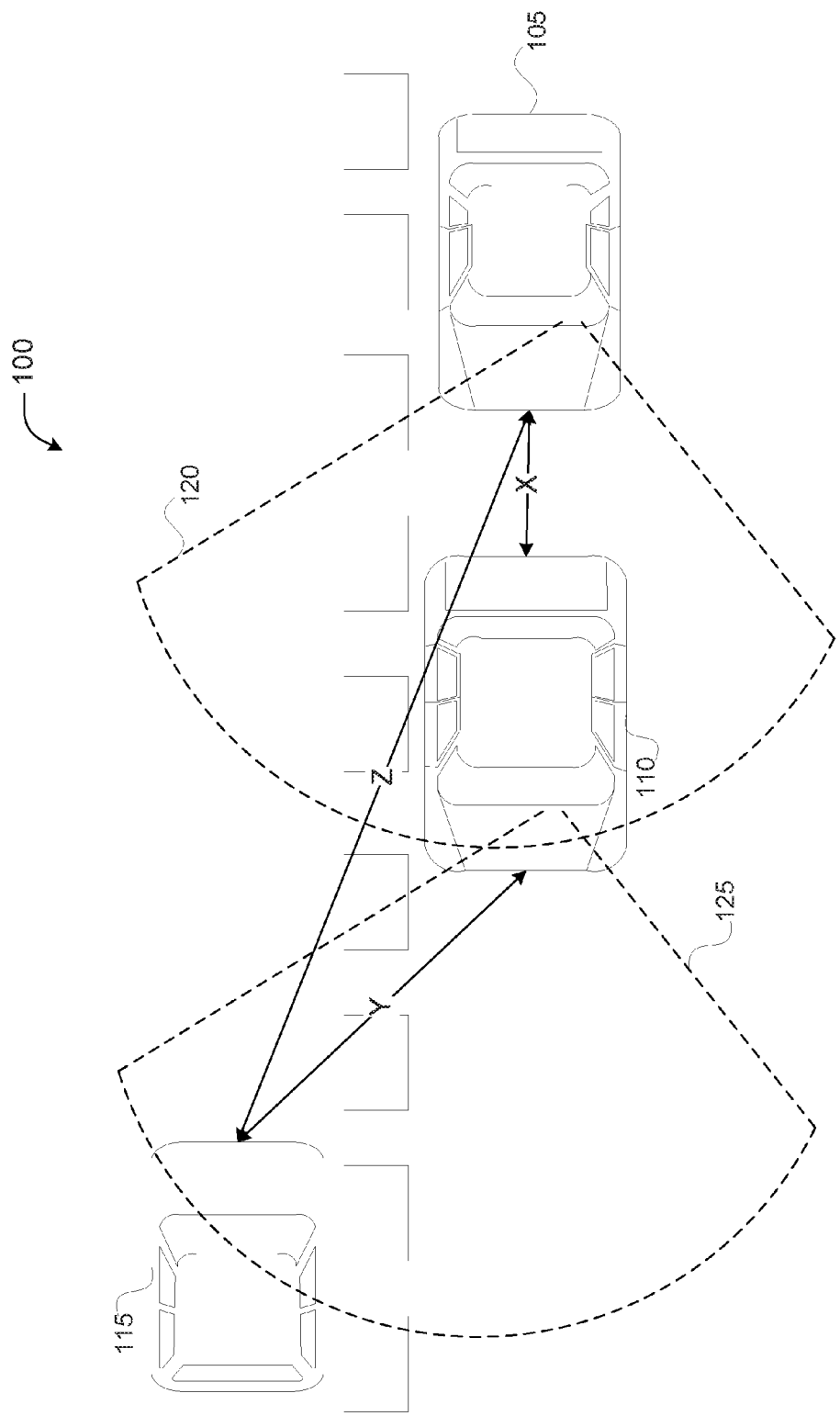
FIG. 1 illustrates an example arrangement in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

Example embodiments disclosed herein provide systems and methods for assisting operation of a vehicle utilizing sensor data obtained by one or more other vehicles. Example embodiments utilize sensor data transmitted from the other vehicle by means of vehicle-to-vehicle (V2V) communications, and determine the position of objects (for example, additional vehicles, road hazards, pedestrians, and the like) in a field of view (FOV) of the sensor(s) of the other vehicle. The example embodiments may utilize one or more sensors in or on the vehicle to determine whether the vehicle should initiate a V2V communications session with the other vehicle. Example embodiments also provide that the position of objects in the FOV of the other vehicle's sensor(s) may be determined locally by a computing device implemented within the vehicle. Example embodiments also provide that an image may be generated for each detected object, which may be displayed in a display device of the vehicle. In embodiments, the display device may be a monitor mounted in the vehicle or a head-up display wherein the generated images are displayed on a windshield of the vehicle. The example embodiments differ from conventional vehicle-implemented object detection systems in that the conventional vehicle-implemented object detection systems typically do not utilize information obtained from other vehicles. Further, the example embodiments differ from conventional V2V communications systems in that the conventional V2V communications systems typically communicate textual data and do not typically communicate raw sensor data.

Referring now to the figures. FIG. 1 shows an arrangement 100 in which a first vehicle 105 may utilize sensor data of a second vehicle 110 for assisting the operation of the first vehicle 105, in accordance with various embodiments. As shown in FIG. 1, arrangement 100 may include first vehicle 105, second vehicle 110, and third vehicle 115 each of which may be traveling on a road. In the example depicted by FIG. 1, the third vehicle 115 may be travelling in an opposite direct as the first vehicle 105 and the second vehicle 110. Additionally, FIG. 1 shows a first FOV 120 of a first sensor (not shown) of the first vehicle 105 and a second FOV 125 of a second sensor (not shown) of the second vehicle 110. The depiction of the illustrative arrangement 100 in FIG. 1 should be taken as being illustrative in nature, and not limited to the scope of the disclosure.

In the arrangement 100, at least the first vehicle 105 and the second vehicle 110 may include a computing device. The computing devices implemented in the first vehicle 105 and/or the second vehicle 110 may include detachable computing devices and/or vehicle-mounted computing devices. The detachable computing devices may include laptop PCs, smart phones, tablet personal computers, wearable computing devices, GPS-based navigation devices, and the like. The detachable computing devices may communicate with other components of a vehicle by wired connection (e.g., universal serial bus (USB), FireWire, Thunderbolt using a MiniDisplayPort (MDP), a controller area network (CAN) and Ethernet, a car mount or vehicle mount, and the like) or a short-range wireless connection (e.g., Bluetooth, ZigBee, Infrared Data Association (IrDA) protocols, ANT and/or ANT+ protocols, and the like). The vehicle-mounted computing devices may be any computing device physically mounted or otherwise embedded in a vehicle, such as in-vehicle infotainment (IVI), in-car entertainment (ICE) devices, an Instrument Cluster (IC), head-up display (HUD) devices, mobile data terminals (MDTs), and/or any other like computing device built into a vehicle. Furthermore, the term "computing device" used herein may also denote embodiments wherein a detachable computing device is connected with a vehicle-mounted computing device via a wired connection or a short-range wireless connection. These computing devices may include one or more processors, one or more memory devices, one or more display devices, one or more sensors, communications circuitry, and other like components. The components of the computing devices are described in detail with regard to FIG. 4.

With reference to FIG. 1, the devices of the arrangement 100 may operate as follows in accordance with various example embodiments.

The first vehicle 105, while traveling, may approach the second vehicle 110. A first sensor (e.g., an optical camera, infrared (IR) camera, and the like) on or in the first vehicle 105 may detect the presence of the second vehicle 110. A computing device of the first vehicle 105 (also referred to as the "first computing device") may receive first sensor data from the first sensor. Based on the first sensor data, the first computing device may determine an object type of the detected object, such as whether the detected object is a vehicle, pedestrian, debris, building, and the like. The first computing device may utilize any suitable object recognition application and/or algorithm to determine the object type.

If the first computing device determines that the detected object from the first sensor data is a vehicle (e.g., the second vehicle 110), the first computing device may determine a first position, which may be a position of the first vehicle 105 relative to the second vehicle 110. As shown in FIG. 1, the first position may be the position X between the first vehicle 105 and the second vehicle 110. The first computing device may determine that, when the first vehicle 105 is within a threshold distance (e.g., the position X or less) of another vehicle (e.g., the second vehicle 110) that sensor data should be obtained from the other vehicle. The threshold distance may be selected or otherwise defined according to known criteria that may be indicative of an obstructed FOV for first operator. Such criteria may be based on a FOV 120 of the first sensor, a known or determined FOV of the vehicle operator (and/or an average vehicle operator FOV as determined according to empirical studies), a size and/or shape of the first vehicle 105, a size and/or shape of the second vehicle 110 as determined by the first computing device based on the first sensor data, a geographic location of the first vehicle 105, one or more detected geographic landmarks or other like objects, weather conditions, regulatory requirements, and/or any other suitable characteristics.

When the first computing device determines that first vehicle is within the threshold distance of the second vehicle 110, the first computing device may initiate a V2V communications session with a computing device of the second vehicle 110 (also referred to as the "second computing device"). The V2V communications session may be established according to know methods and/or standardized protocols. Once the V2V communications session is established, the first computing device may receive second sensor data of a second sensor in or on the second vehicle 110. The first computing device may continuously process the received second sensor data. The first vehicle 105 may operate an object detection application to detect objects within the received second sensor data. Upon detection of an object from the received second sensor data, the first computing device may determine an object type of the detected object, such as whether the detected object is a vehicle, pedestrian, debris, building, and the like. The first computing device may utilize any suitable object recognition application and/or algorithm to determine the object type.

When the first computing device determines that the detected object in the second sensor data is another vehicle (e.g., the third vehicle 115), the first computing device may determine a second position, which may be a position of the second vehicle 110 relative to the third vehicle 115. Using the first position and the second position, the first computing device may determine a third position, which may be a position of the first vehicle 105 relative to the third vehicle 115. For example, as shown by FIG. 1, the second position may be represented by the position Y, which may be a distance between the second vehicle 110 and the third vehicle 115. Further, in FIG. 1, the first computing device may use the position X and the position Y to determine the position Z, which may be the position of the third vehicle 115 relative to the first vehicle 105. In various embodiments, the first computing device may use detected objects (e.g., the third vehicle 115) as an input to an object detection and/or object or avoidance system in order to warn the first operator of the presence of the third vehicle 115. For example, the first computing device may input the detected objects from the first sensor data and the second sensor data into an advanced driver assistance system (ADAS).

As shown in FIG. 1, the third vehicle 115 is not within the FOV 120 of the first sensor of the first vehicle 105, and thus, the third vehicle 115 may not be visible by either the operator of the first vehicle 105 (also referred to as the "first operator") or the first sensor. Therefore, if the first operator were to attempt an overtaking maneuver to pass the second vehicle 110 without knowing about the presence of the third vehicle 115, the first vehicle 105 may potentially collide with the vehicle 115 causing a serious accident. The example embodiments may provide one or more images representative of the third vehicle 115 to be displayed in a display device of the first vehicle 105 in order to avoid a collision between the first vehicle 105 and the second vehicle 115. The viewpoint of first operator can be seen in FIG. 2.

Figure 2:
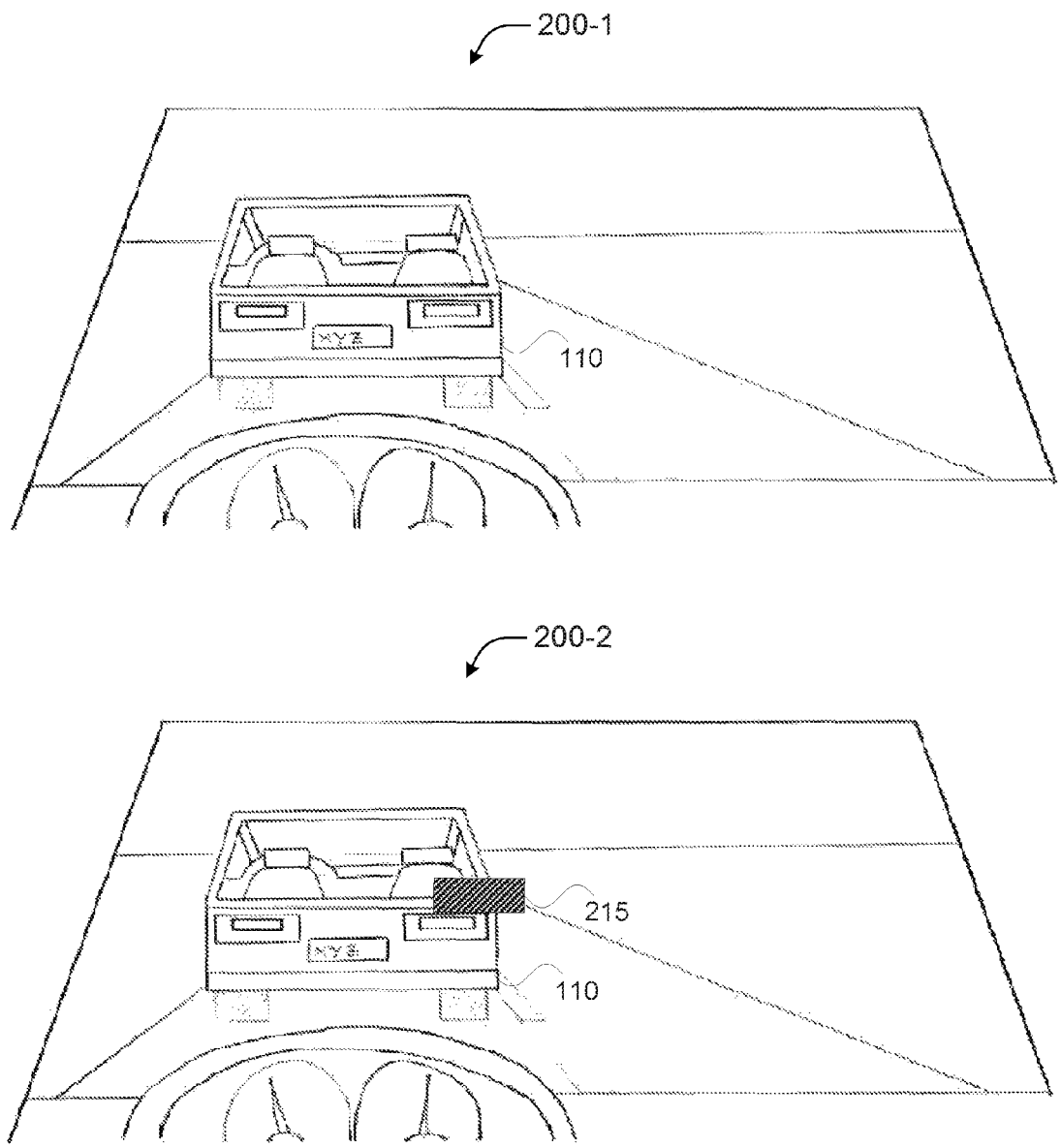
FIG. 2 illustrates a user interface and vantage point of an operator of a vehicle in the arrangement of FIG. 1, in accordance with various embodiments.

FIG. 2 illustrates a user interface 200 and a vantage point of first operator in arrangement 100 of FIG. 1, in accordance with various embodiments. The user interface 200 may include user interface 200-1 and user interface 200-2. The user interface 200 of FIG. 2 may be part of a head-up display wherein images may be projected onto a windshield of the first vehicle 105.

The user interface 200-1 may show a first vantage point of first operator prior to detection of the third vehicle 115. Thus, user interface 200-1 may show the first vantage point including a rear portion of the second vehicle 110 through the windshield of the first vehicle 105 without any generated images. User interface 200-2 may show a second vantage point of first operator upon detection of the third vehicle 115. The user interface 200-2 may show both the rear portion of the second vehicle 110 and an image 215. The image 215 may be a representation of the third vehicle 115. In various embodiments, the first computing device may map the third position to a corresponding position on a display device. For example, the position Z shown in FIG. 1 may be mapped to a position Z' (not shown) on a head-up display device of the windshield of the first vehicle 105 such that the generated image 215 may be positioned where the operator would see the third vehicle 115 at the position Z. In this way, the image 215 may warn first operator of the presence of the third vehicle 115, and first operator may act accordingly. In some embodiments, a size of the image 215 may be based on a distance between the first vehicle 105 and the third vehicle 115, and the size of the image 215 may be altered or adjusted based on a changing distance between the first vehicle 105 and the third vehicle 115. For example, in some embodiments, the image 215 may first appear at a relatively small size when the third vehicle 115 is first detected, and the first computing device may increase the size of the image 215 as the third vehicle 115 approaches the first vehicle 105 (e.g., gets closer to the first vehicle 105). Furthermore, the first computing device may decrease the size of the image 215 as the third vehicle 115 moves further away from the first vehicle 105. Furthermore, in some embodiments, the first computing device may use detected objects as an input to an object detection and/or object or avoidance system. In such embodiments, the image 215 may only be displayed when the third position is within a predefined threshold distance of the first vehicle 105.

Although FIG. 2 shows an example wherein a head-up display device is used to project or otherwise display the image 215 on a windshield, the example embodiments are not limited thereto. In other embodiments, the first vehicle 105 may include any suitable display device, such as a light-emitting diode (LED) display device, an organic LED (OLED) display device, a liquid crystal display (LCD) device, a quantum dot display device, a projector display device, a floating display, and/or any other like display device. Furthermore, in various embodiments, the display device may be a touchscreen input device wherein a vehicle operator or other like user may provide one or more inputs to the computing device through one or more gestures by touching the display device with a stylus/pen and/or one or more fingers. The aforementioned display device technologies are generally well known, and a description of the functionality of such display devices is omitted for brevity.

Figure 3:
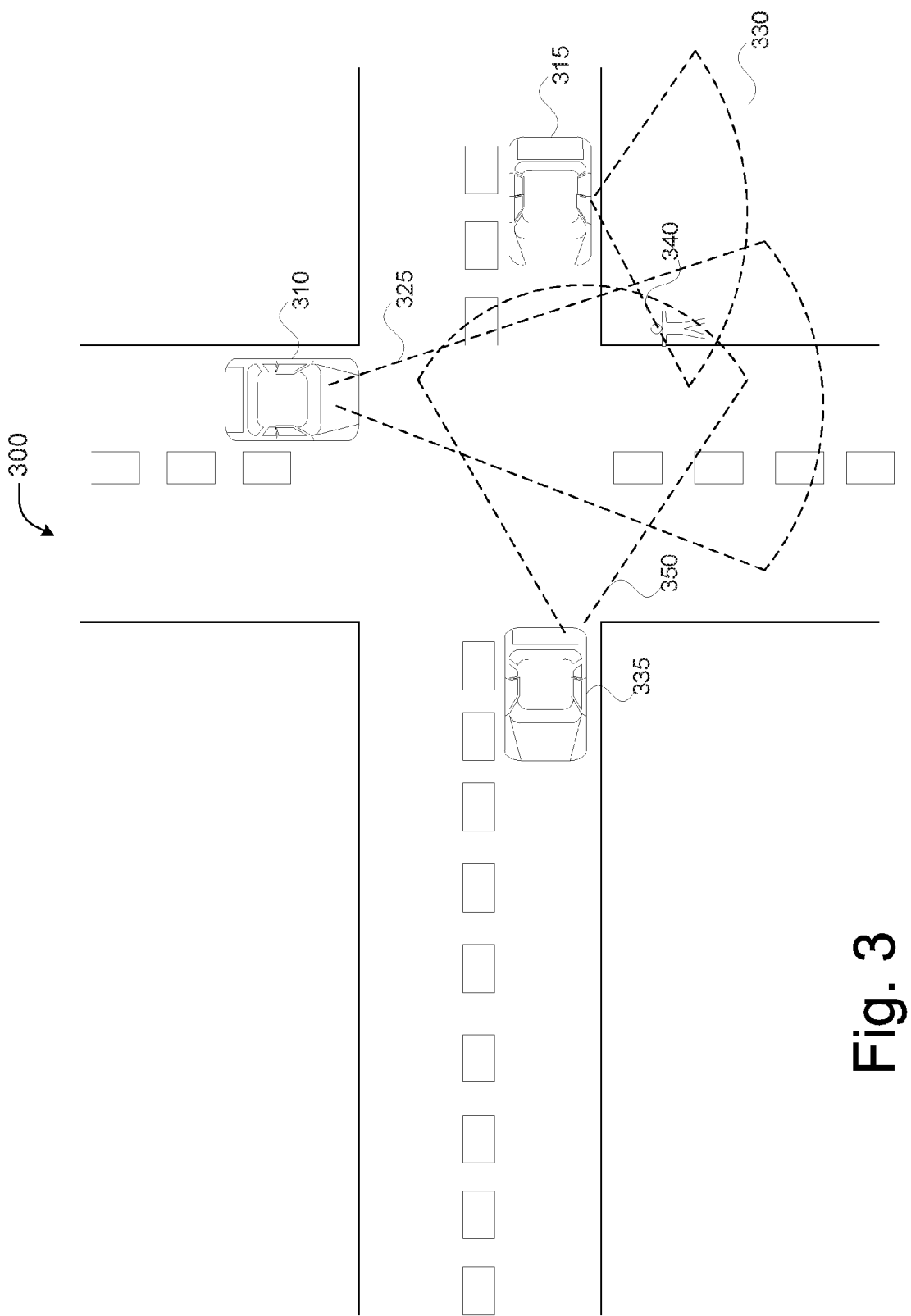
FIG. 3 illustrates another example arrangement in which various example embodiments described in the present disclosure may be implemented.

FIG. 3 shows an arrangement 300 in which a first vehicle 310 may utilize sensor data of a other vehicles 315 and/or 335 for assisting the operation of the first vehicle 310, in accordance with various other embodiments. As shown in FIG. 1, arrangement 300 may include first vehicle 310, second vehicle 315, and third vehicle 335, each of which may be located at an intersection as depicted. Additionally, FIG. 3 shows a first FOV 325 of the first vehicle 310, a second FOV 330 of the second vehicle 315, and third FOV 350 of the third vehicle 335. Each of the first vehicle 310, the second vehicle 315, the third vehicle 335, may include a same or similar computing device and one or more sensors as discussed previously with regard to FIG. 1. The depiction of the illustrative arrangement 300 in FIG. 3 should be taken as being illustrative in nature, and not limited to the scope of the disclosure.

According to the example of arrangement 300, the computing device of the first vehicle 310 (also referred to as the "first computing device") may continuously receive video streams and/or raw sensor data streams from cameras/sensors of other nearby vehicles (e.g., from computing devices of the second vehicle 315, the third vehicle 335,). In some embodiments, the first computing device may also obtain position information (e.g., GPS coordinates and the like) from the other nearby vehicles. In some embodiments, the first computing device may also obtain sensor data and/or video streams from other devices, such as surveillance cameras mounted or otherwise fixed to stationary objects (not shown), images captured by pedestrian mobile devices, satellite images, and the like. Furthermore, in embodiments, the first computing device may obtain cartographic data from a cartographic data provider, which may be operated by a third-party service that generates maps and/or provides map-based services. The first computing device may store the video streams and/or sensor data in a buffer, which may have a fixed duration and/or fixed size. The first computing device may utilize any suitable image processing application/algorithm to build a three dimensional (3D) model of the region using the cartographic data, the position information, and the multiple camera/sensor data streams. This 3D model may be displayed to a vehicle operator of the first vehicle 310 and/or used as an input to an object detection and/or object or avoidance system.

Specifically, in arrangement 300, there is an object (in this case a pedestrian 340) that is simultaneously observed by a side-mirror mounted camera of the second vehicle 315, front facing camera of first vehicle 310 and a rear facing sensor of the third vehicle 335. By knowing the relative position of the other nearby vehicles sensors/cameras as described previously, the processing application/algorithm of the computing device of the first vehicle 310 may generate a 3D image of the pedestrian 340 using the three data streams, and the first vehicle 310 may display the 3D image representative of the pedestrian 340 on a display device of the first vehicle 310, or use the 3D image of the pedestrian as an input to an object detection and/or object or avoidance system. Since the generated 3D image representation of the pedestrian is generated using all the sensor/camera data of many or all nearby vehicles and/or other devices, the first vehicle 310 may have extra information above and beyond a model developed using only the sensors/cameras of the first vehicle 310. This is because each sensor/camera will have unique point of view of the region. Therefore, the 3D model of the example embodiments may be more accurate than typical in-vehicle modeling systems.

For example, a first computing device of the first vehicle 310 may store one or more 3D models of the roadway depicted by FIG. 3. Using local on-vehicle pre-processing of both first sensor data obtained by a first sensor of the first vehicle 310 and sensor data obtained from of adjacent vehicles, the first computing device may develop a more accurate 3D model of the roadway. Specifically in the case of arrangement 300, there may be a newly object deployed in an area of the roadway (not shown) that does not exist on any of the 3D models stored by the first vehicle 310. The object may be observed by sensors in the first vehicle 310 the second vehicle 315 and/or the third vehicle 335 from three different points of view. By knowing the relative position of the three sensor feeds, the processing algorithm(s) operated by the first computing device may generate a 3D model of the object using the sensor data from each of the three sensor feeds, and incorporate the object into an updated 3D model of the roadway. In embodiments, the updated 3D model may be compared with the previous version of the 3D model. If a difference between the previous version of the 3D model and the updated 3D model is larger than a predetermined or desired threshold, the first computing device may transmit the updated 3D model to a cartographic service provider. In this way, the cartographic service provider may update the 3D model and distribute the 3D model to a fleet of subscribing vehicles. Since the updated 3D model of the roadway is generated using a plurality of sensor feeds, the updated 3D model may be more accurate than a 3D model generated using only a single sensor feed, and may also reduce communications with the cartographic service provider since cross vehicle sensor fusion is happening locally at the first computing device.

Figure 4:
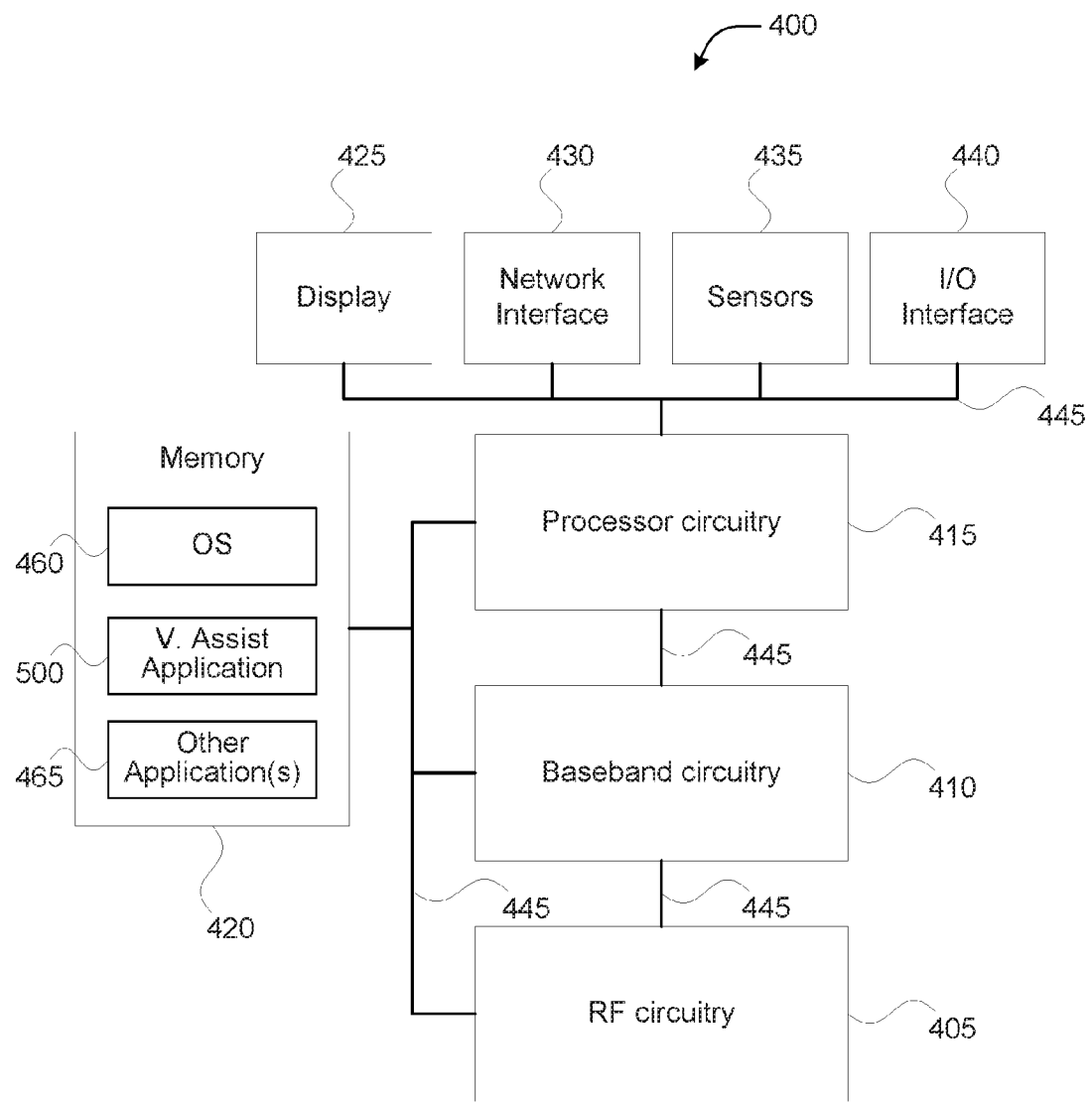
FIG. 4 illustrates the components of a computing device, in accordance with various example embodiments.

FIG. 4 illustrates the components of a computing device 400, in accordance with various example embodiments. FIG. 4 illustrates, for one example embodiment, computing device 400 comprising radio frequency (RF) circuitry 405, baseband circuitry 410, processor circuitry 415, memory/storage 420, display 425, camera 430, sensor 435, and input/output (I/O) interface 440, coupled with each other by bus 445 at least as shown by FIG. 4. Although FIG. 4 illustrates various components of the computing device 400, the embodiments described herein may be implemented into a system using any suitably configured hardware and/or software. In some embodiments, computing device 400 may include many more components than those shown in FIG. 4, however, it is not necessary to show and describe such components to illustrate the example embodiments.

Memory 420 may be a hardware device configured to store an operating system 460 and program code for one or more software components, such as vehicle assistance application 500 (also referred to as "v. assist app 500"), other application(s) 465, and/or one or more other applications (not shown). Memory 420 may be a computer readable storage medium that generally includes a random access memory (RAM), read only memory (ROM), a flash memory device, a solid state disk (SSD), and/or other like storage media capable of storing and recording data. The program code and/or software components may also be loaded from a separate computer readable storage medium into memory 420 using a drive mechanism (not shown). Such separate computer readable storage medium may include a memory card, memory stick, removable flash drive, sim card, a secure digital (SD) card, and/or other like computer readable storage medium (not shown). In some embodiments, software components may be loaded into memory 420 via the RF circuitry 405, rather than via a computer readable storage medium.

During operation, memory 420 may include operating system 460, v. assist app 500, and other application(s) 465. Operating system 460 may manage computer hardware and software resources and provide common services for computer programs. Operating system 460 may include one or more drivers, such as a display driver, sensor drivers (e.g., a camera driver, etc.), audio drivers, and/or any other like drivers that provide an interface to hardware devices thereby enabling operating system 460, v. assist app 500, and other application(s) 465 to access hardware functions without needing to know the details of the hardware itself. The operating system 460 may be a general purpose operating system or an operating system specifically written for and tailored to the computing device 400.

Figure 5:
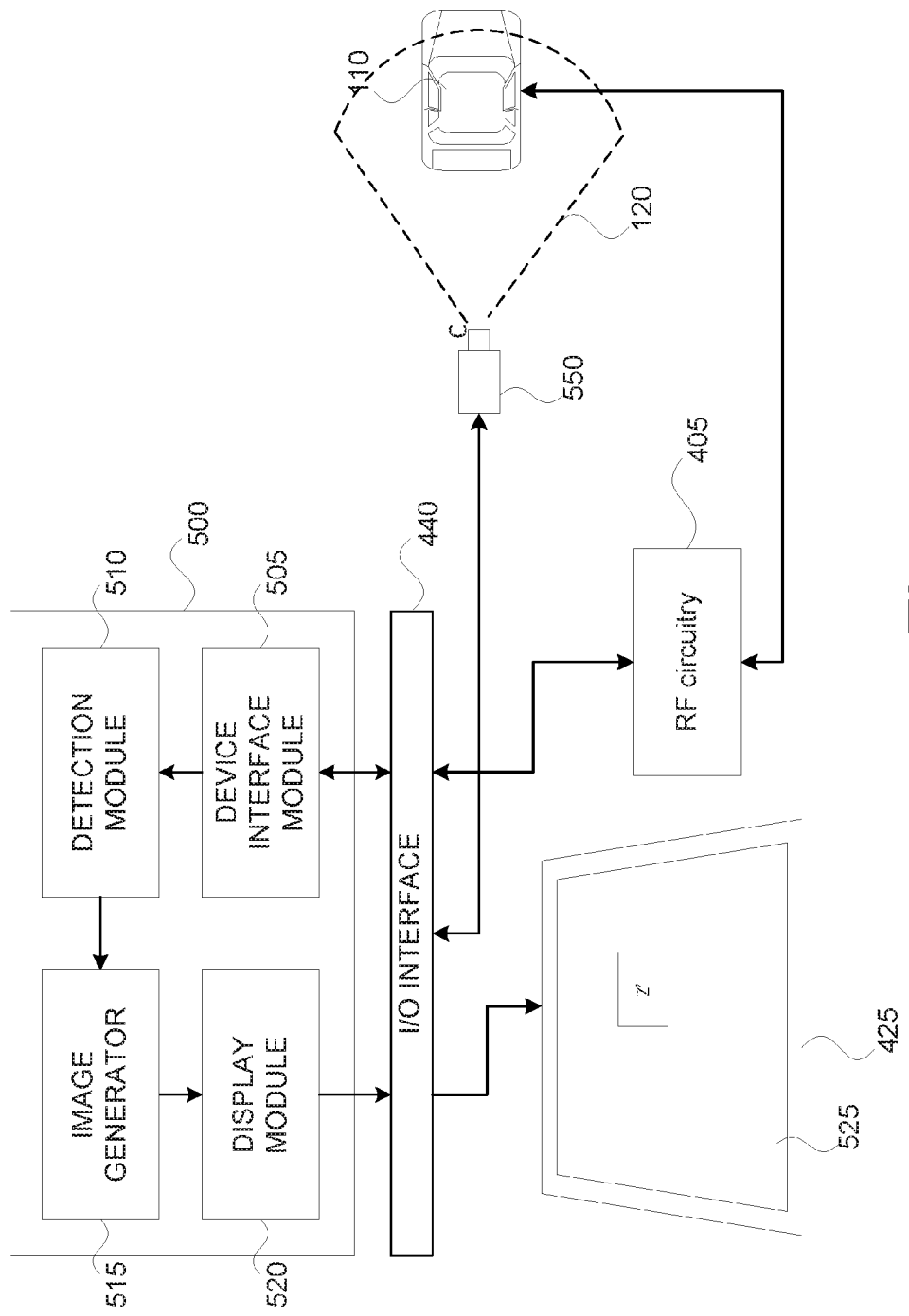
FIG. 5 illustrates example logical components and interaction points of a vehicle assistance application, in accordance with various embodiments.
Figure 6:
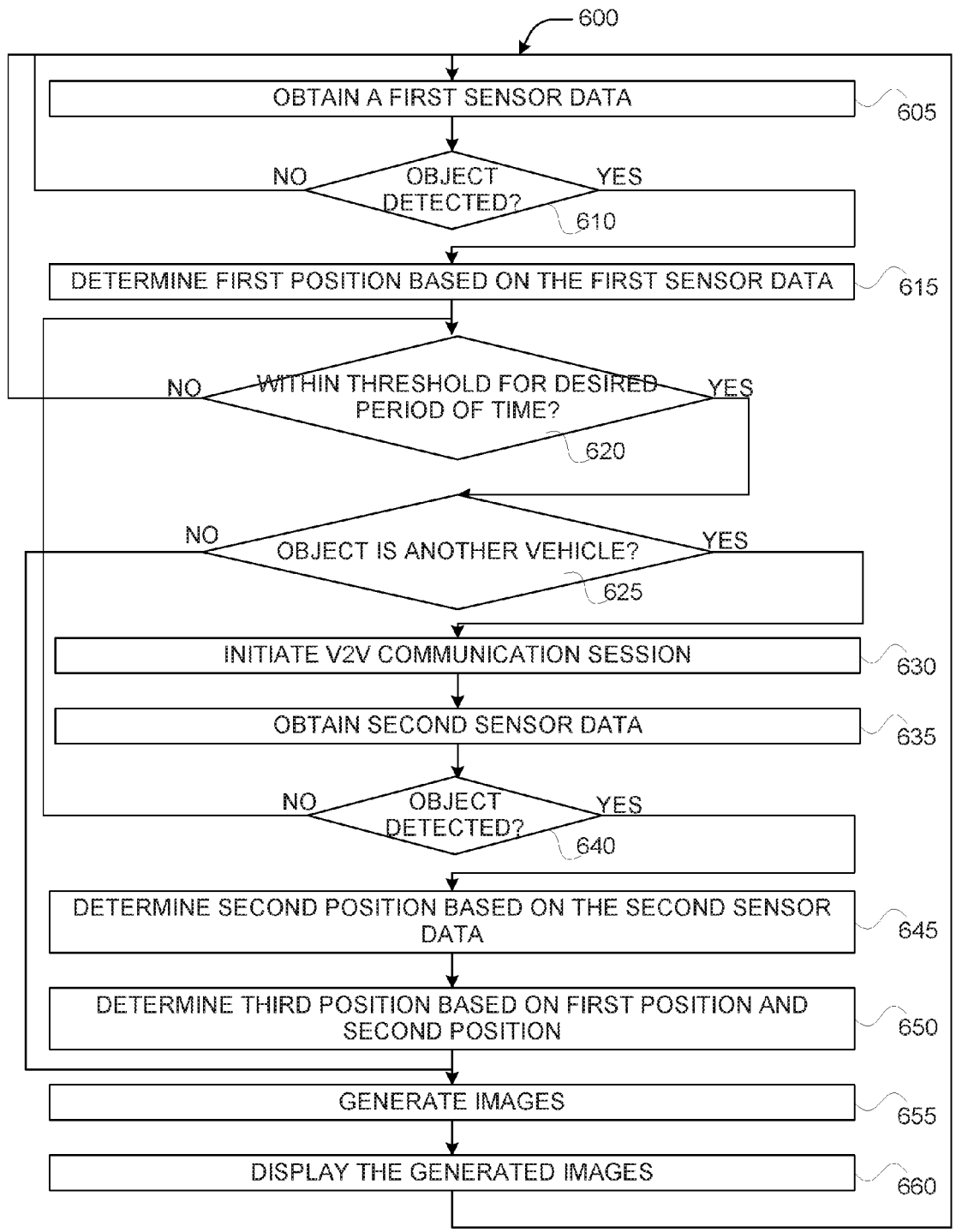
FIG. 6 illustrates an example process of a vehicle assistance application, in accordance with various embodiments.

V. assist app 500 may be a collection of software modules and/or program code that enables the computing device 400 to operate according to the various example embodiments as discussed with regard to FIGS. 5-6. Other application(s) 465 may be a collection of software modules and/or program code that enables the computing device 400 to perform various function of the computing device 400.

Processor circuitry 415 may be configured to carry out instructions of a computer program by performing the basic arithmetical, logical, and input/output operations of the system. The term "processor" as used herein refers to a physical central processing unit (CPU). The processor circuitry 415 may include a single-core processor, a dual-core processor, a triple-core processor, a quad-core processor, a graphics processing unit (GPU), etc. The processor circuitry 415 may perform a variety of functions for the computing device 400 and may process data by executing program code, one or more software modules, firmware, middleware, microcode, hardware description languages, and/or any other like set of instructions stored in the memory 420. The program code may be provided to processor circuitry 415 by memory 420 via bus 445, one or more drive mechanisms (not shown), and/or via RF circuitry 405. In order to perform the variety of functions and data processing operations, the program code and/or software components may be executed by the processor circuitry 415. On execution by the processor circuitry 415, the processor circuitry 415 may cause computing device 400 to perform the various operations and functions delineated by the program code.

For example, in various embodiments, the v. assist app 500 may include various modules configured to operate (through hardware and/or software) to obtain sensor data via a V2V communications session, generate images based on the obtained sensor data, and display the generated images as described herein. The various modules of the v. assist app 500 may be loaded into the memory 420. The various modules may include a device interface module 505, a detection module 510, an image generator 515, and a display module 520 (as discussed with regard to FIG. 5). Once the various modules of the v. assist app 500 are loaded into memory 420 and executed by one or more processors of the processor circuitry 415. Upon execution, the one or more processors may be configured to cause computing device 400 to obtain first sensor data from a first sensor on or in a first vehicle, wherein the first sensor data is representative of a second vehicle proximate to the first vehicle; determine based on the first sensor data, a first position wherein the position is a position of the second vehicle relative to the first vehicle; initiate a V2V communications session with the second vehicle; receive second sensor data from the second vehicle during the V2V communications session; determine a second position based on the second sensor data, wherein the second position is a position of the second vehicle relative to a third vehicle detected by a second sensor of the second vehicle; and display an image representative of the third vehicle on a display device associated with the computing device. While specific modules are described herein, it should be recognized that, in various embodiments, various modules may be combined, separated into separate modules, and/or omitted. Additionally, in various embodiments, one or more modules may be implemented on separate devices, in separate locations, or distributed, individually or in sets, across multiple processors, devices, locations, and/or in cloud-computing implementations.

Bus 445 may be configured to enable the communication and data transfer between processor circuitry 415 and memory 420. Bus 445 may comprise a high-speed serial bus, parallel bus, internal universal serial bus (USB), Front-Side-Bus (FSB), a PCI bus, a PCI-Express (PCI-e) bus, a Small Computer System Interface (SCSI) bus, and/or any other suitable communication technology for transferring data between components within computing device 400.

The computing device 400 may optionally include a network interface 430. Network interface 430 may be any hardware device that connects computing device 400 to a computer network. The network interface may connect computing device 400 to a computer network via a wired connection and may operate in accordance with a wired communications protocol, such as Ethernet, token ring, Fiber Distributed Data Interface (FDDI), and/or other like network communications protocols). The network interface 430 may also include one or more virtual network interfaces configured to operate with application 365 and/or other like applications.

I/O interface 440 may be a computer hardware component that provides communication between the computing device 400 and one or more other devices. The I/O interface 440 may include one or more user interfaces designed to enable user interaction with the computing device 400 and/or peripheral component interfaces designed to provide interaction between the computing device 400 and one or more peripheral components. User interfaces may include, but are not limited to a physical keyboard or keypad, a touchpad, a speaker, a microphone, etc. Peripheral component interfaces may include, but are not limited to, a non-volatile memory port, an audio jack, a power supply interface, a serial communications protocol (e.g., Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), etc.

The baseband circuitry 410 may include circuitry such as, but not limited to, one or more single-core or multi-core processors. These processor(s) may include a baseband processor. The baseband circuitry may handle various radio control functions that may enable communication with one or more radio networks via the RF circuitry 405. It should be noted that in various embodiments, the baseband circuitry may include radio control circuitry or otherwise operate radio control circuitry to perform the various radio control functions. In various embodiments, the radio control circuitry may utilize the baseband processor to perform at least some of the radio control functions. The radio control functions may include, but are not limited to, signal modulation, encoding, decoding, radio frequency shifting, etc. In some embodiments, the baseband circuitry 410 may provide for communication compatible with one or more radio technologies. For example, in some embodiments, the baseband circuitry may support communication in accordance with one or more wireless communications protocols and/or one or more cellular phone communications protocols, such as Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a-p, Wi-MAX, Long Term Evolution (LTE), dedicated short range communications (DSRC), and/or any other "wireless" communication protocols, including RF-based, optical, and so forth. Embodiments in which the baseband circuitry 410 is configured to support radio communications of more than one wireless protocol may be referred to as multi-mode baseband circuitry. In such embodiments, the baseband circuitry 410 may include an individual baseband processor for generation and processing of the baseband signals and for controlling operations of the RF circuitry 405 in accordance with each of the aforementioned wireless communications protocols. In various embodiments, baseband circuitry 410 may include circuitry to operate with signals that are not strictly considered as being in a baseband frequency. For example, in some embodiments, baseband circuitry 410 may include circuitry to operate with signals having an intermediate frequency, which is between a baseband frequency and a radio frequency.

RF circuitry 405 may enable communication with wireless networks using modulated electromagnetic radiation through a non-solid medium. In various embodiments, the RF circuitry 405 may include switches, filters, amplifiers, etc. to facilitate the communication with one or more wireless networks. The RF circuitry 405 may be coupled with one or more antenna elements (not shown) to enable communication with one or more other devices. RF circuitry 405, as controlled by the baseband circuitry 410, may generate or otherwise produce radio waves to transmit data to one or more other devices via the one or more antenna elements. The RF circuitry 405 may be configured to receive and convert a signal from a modulated radio wave into usable information, such as digital data, which may be provided to one or more other components of computing device 400 via bus 445. In various embodiments, RF circuitry 405 may include circuitry to operate with signals that are not strictly considered as being in a radio frequency. For example, in some embodiments, RF circuitry 405 may include circuitry to operate with signals having an intermediate frequency, which is between a baseband frequency and a radio frequency. In order to communicate via a V2V communications session and/or a vehicle-to-everything (V2X) communications session, the baseband circuitry 410 and the RF circuitry 405 may be configured to support a combination of DSRC channels, which may be defined by the IEEE 802.11p standard and/or cellular channels (e.g., long term evolution (LTE), fifth generation (5G), etc.) systems. The 802.11p standard may use channels of 10 MHz bandwidth in the 5.9 GHz band (5.850-5.925 GHz). The DSRC may be one or more one-way or two-way short-range or medium-range wireless communication channels that are specifically designed for automotive vehicles. In this regard, the RF circuitry 405 may be equipped with multiple radios operating in different spectrum bands. It should be noted that the RF circuitry 405 and the baseband circuitry 410 may be collectively referred to as "communications circuitry."

Sensors 435 may include one or more sensing devices to determine position information (or alternatively "position data"), orientation information (or alternatively "orientation data"), environmental conditions, and/or like information related to the computing device 400. In some embodiments, the sensors 435 may include, but are not limited to, an accelerometer, gyroscope, gravimeter, magnetometer, proximity sensor, ambient light sensor, and location (or alternatively "geolocation"), positioning, and/or navigation circuitry, such as a Global Positioning System ("GPS") receiver, as well as software to convert received GPS signals into a location and/or position (within some margin of error). In embodiments, the sensors 435 may be embedded in the computing device 400.

Display 425 may be any type of output device that is able to present information in a visual form based on received electrical signals. Display 425 may be a head-up display device, a light-emitting diode (LED) display device, an organic LED (OLED) display device, a liquid crystal display (LCD) device, a quantum dot display device, a projector device, and/or any other like display device. Furthermore, in various embodiments, the display device 425B may be a touchscreen input device wherein the user 105 may provide one or more inputs to the computing device 400 through one or more gestures by touching the display device 425B with a stylus/pen and/or one or more fingers. The aforementioned display device technologies are generally well known, and a description of the functionality of the display 425 is omitted for brevity. As discussed previously, in various embodiments the display 425 may be separate from the computing device 400. Display device 425 may be coupled with the computing device 400 by way of a wired connection, such as RCA connectors, a video graphics array (VGA) connector, a digital visual interface (DVI) connector and/or mini-DVI connector, a high-definition multimedia interface (HDMI) connector, an S-Video connector, and/or the like. Furthermore, the display 425 may be coupled with the computing device 400 via a wireless connection. In such embodiments, the computing device 400 may communicate one or more signals to the display 425 using one or more of the wireless communications protocols discussed previously. Furthermore, in some embodiments, the display 425 and the computing device 400 may operate in conjunction with one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols.

FIG. 5 illustrates example logical components and interaction points of the v. assist app 500, in accordance with various embodiments. For illustrative purposes, the operations of the various modules shown by FIG. 5 will be described as being performed by the first vehicle 105 as described with respect to FIG. 1. As shown in FIG. 5, v. assist app 500 may include device interface module 505, detection module 510, image generator 515, and display module 520. According to various example embodiments, and with reference to FIGS. 1-4, the computing device 400 including the v. assist app 500 may operate as follows.

The sensor 550 may detect one or more objects in FOV 120, such as second vehicle 110. The sensor 550 may be in or on the first vehicle 105. For example, the sensor 550 may be mounted on a windshield, rear-view mirror, side-mirror, front or back bumper, and/or any other suitable location on or in the first vehicle 105. The sensor 550 may be referred to as a "first sensor." Although FIG. 5 depicts a single sensor 550, the example embodiments provide that multiple sensor 550 may be in or on the first vehicle 105. Thus, in various embodiments, the computing device 400 may be communicatively coupled with a plurality of first sensors, and the device interface module 505 may receive first sensor data from each of the plurality of first sensors.

In various embodiments, the sensor 550 may include one or more motion capture devices that may be configured to capture motion by detecting a change in position of a body relative to its surroundings, or by detecting a change in the surroundings relative to the body. In such embodiments, the one or more sensor may be configured to measure the strength and/or speed of a body's motion. In various embodiments, motion may be detected by sound, opacity, reflection of transmitted electromagnetic energy (i.e., light), and/or other like means of detecting motion. In various embodiments, sensor 550 may include one or more optical cameras and/or one or more thermographic (infrared (IR)) cameras, which may be configured to form images using infrared radiation. Such infrared cameras may be similar to optical-lens cameras, which form images using visible light, but instead operate in wavelengths in the infrared range of the electromagnetic spectrum. In embodiments where sensor 550 include one or more infrared cameras, sensor 550 may also include an infrared projector and/or infrared laser projector, which may be configured to project an infrared beam at one or more targets and/or one or more objects surrounding a target. The one or more infrared cameras may be configured to sense a reflection of the infrared beam being reflected off the one or more targets. As noted previously, the sensor 550 may be mounted separate from the computing device 400. In such embodiments, the sensor 550 may be communicatively coupled with the computing device 400 via a wired or wireless connection. The sensor 550 may provide sensor data to the processor circuitry 415 via the network interface 430 and/or the I/O interface 440. In this regard, the sensor 550 may also include their own I/O interface and/or a network interface configured to connect with the network interface 430 and/or the I/O interface 440, respectively.

The sensor 550 may detect one or more objects according to any suitable method, and generate sensor data based on the one or more detected objects. The sensor 550 may be referred to as a first sensor and the sensor data obtained by the sensor 550 may be referred to as first sensor data. The first sensor data may then be provided to the detection module 510 via the I/O interface 440 and the device interface module 505. For example, in embodiments where the sensor 550 includes one or more IR capture devices, the sensor 550 may also include an IR projector and/or IR laser projector, which may be configured to project an IR beam at one or more objects and sense a reflection of the infrared beam being reflected off the one or more objects. In some embodiments, the IR projector may be an IR LED that emits IR radiation as the IR beam or signal. The IR beam or signal may be a sequence of flashes or pulses that are emitted at a predefined frequency. The sensor 550 may include circuitry to track a return timing at which the IR beam/reflection is captured by the IR capture device. The sensor 550 may convert or otherwise generate sensor data based on the return timing. In some embodiments, instead of using IR-based sensors, the sensor 550 may use ultraviolet or visible light in a same or similar manner as discussed previously. Such systems may be referred to as LIDAR systems. In embodiments where the sensor 550 is an optical-based camera, such as a video camera, the sensor 550 may capture and/or record video data, and provide the video data to the detection module 510 as the sensor data. In some embodiments, an RF antenna associated with the RF circuitry 405 may capture one or more signals being broadcast by the second vehicle 110 and measure various signal characteristics, which may be used instead of the sensor data or to supplement the sensor data. In such embodiments, the detection module 510 may determine the position of the second vehicle 110 by way of triangulation.

The device interface module 505 may obtain the sensor data from the sensor 550 via the I/O interface 440, and provide the data to the detection module 510 and/or other applications (not shown) for processing. Device interface module 505 may be one or more software modules configured to interact with the various hardware components of the computing device 400. The device interface module 505 and I/O interface 440 may be collectively referred to as "device interface circuitry." In embodiments, the device interface module 505 may control the sensor 435 via the I/O interface 440 to adjust how the sensor 435 is to obtain the sensor data, such as by performing zoom-in or zoom-out operations and the like. In some embodiments, the device interface module 505 may convert the received sensor data into a format that is usable by the detection module 510 in order for the detection module 510 to perform the various detection algorithms discussed herein. Additionally, the device interface module 505 may obtain second sensor data from the second vehicle 110 via the RF circuitry 405 when a V2V communications session has been established. The second sensor data may be raw (unprocessed) data, such as uncompressed video data, IR data, LIDAR data, and the like, or the second sensor data may be processed sensor data, such as compressed video data and the like.

The detection module 510 may obtain the sensor data from the device interface module 505, determine an object type of a detected object, and determine a position of the first vehicle 105 relative to the detected object based on the sensor data. In embodiments where the sensor 550 is an IR capture device, the detection module 510 may determine the position based on the return timing discussed previously. In embodiments where the sensor 550 is an optical-based image capture device, the detection module may use any known vision recognition algorithms, which may determine a relative distance of the first vehicle 105 to a known position within the field of view. In some embodiments, Real-Sense Technology® developed by Intel® may be employed to further enhance the position determination.

In various embodiments, the detection module 510 may use signals broadcast by a computing device of the second vehicle 110 to determine the position of the first vehicle 105 relative to the second vehicle 110 by way of triangulation. One method of triangulation may include performing a received signal strength indication (RSSI) calculation of one or more signals generated by the second vehicle 110 and a RSSI calculation of one or more signals generated by another device, such as a base station, an RSU, and the like. Such RSSI calculations may be calculated according to know methods. Additionally, instead of, or in addition to using the RSSI, example embodiments may also utilize other information associated with the one or more signals, such as a path loss measurement, packet delay time, a signal to noise ratio, a measure of throughput, a jitter, latency, a round trip time (RTT), a number of interrupts, an out-of-order delivery of data packets, and/or other like parameters. Furthermore, any of the aforementioned triangulation methods may be combined to determine the position of the second vehicle 110. Furthermore, such triangulation methods may be combined with the return timing information obtained by an IR capture device and/or vision recognition algorithms discussed previously.

Once the detection module 510 determines the position of the second vehicle 110 relative to the first vehicle 105 (also referred to as the "first position"), the detection module may determine whether the first position is within a threshold distance, such as within a predefined distance or a dynamically adjusted distance. If the detection module 510 determines that the first position is within the desired distance, then the detection module 510 may initiate a V2V communications session with the second vehicle 110 by issuing commands to the RF circuitry 405 and/or baseband circuitry 410. The V2V communications session may be established according to known protocols. Once established, the detection module 510 may obtain second sensor data from a second sensor of the second vehicle 110 via the RF circuitry 405, the I/O interface 440, and the device interface module 505. Once the detection module 510 obtains the second sensor data, the detection module 510 may use the known detection algorithms as discussed previously to determine whether the second sensor data is indicative of another object detected by the second sensor (e.g., the third vehicle 115 shown in FIG. 1). When the detection module 510 determines that another object is detected by the second sensor, the detection module 510 may determine a position of the other object relative to the second vehicle 110 (also referred to as a second position), and then determine a position of the other object relative to the first vehicle 105 based on the first position and the second position (also referred to as a third position). The detection module 510 may then provide the determined third position and the second sensor data to the image generator 515 to generate an image indicative of the detected object.

The image generator 515 may obtain the second sensor data from the detection modules 510 and generate an image of one or more detected objects based on the second sensor data. The image generator 515 may generate images according to any suitable image generation method. In some embodiments, the image generator 515 may generate a generic image to represent an object, such as a square, rectangle, circle, etc. In other embodiments, the image generator 515 may determine an object type of the detected object and generate and image representative of the object type, such as an image of a car when the detected object is an automotive vehicle or an image of a person when the detected object is a pedestrian. Furthermore, the image generator 515 may adjust a size, shape, color, or any other characteristic of the image according to a size or magnitude of the third position. In this way, the characteristics of the generated images may be indicative of the magnitude of the third position. The generated images may then be provided to the display module 520 for display.

In embodiments where the second sensor is an optical-based image capture device, such as a video camera, the second sensor data may be compressed video data. In such embodiments, the image generator 515 may perform various decompression operations and provide the video data to the display module 520. In other embodiments, the image generator 515 may be omitted or bypassed when the second sensor data is video data, and in such embodiments, the display module 520 may perform the video data decompression and/or processing (e.g., as resizing, rotation, skewing, cropping, text and/or graphics overlay, and the like) to display the video data.

The display module 520 may obtain the generated images or video data from the image generator 515 and provide the images to the display device 425 for display. The display module 520 may be one or more software modules that operate in conjunction with one or more hardware devices to provide data stream segments to the display device 425 via the I/O interface 440. The display module 520 may operate in accordance with one or more known display protocols, such as video graphics array (VGA) protocol, the digital visual interface (DVI) protocol, the high-definition multimedia interface (HDMI) specifications, the display pixel interface (DPI) protocol, and/or any other like standard that may define the criteria for transferring audio and/or video data to a display device. Furthermore, the display module 520 may operate in accordance with one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols. In such embodiments, the display module 520 may provide video data or data stream segments to the display device 425 via the I/O interface 440.

In embodiments where the image generator 515 generates an image to be displayed, the display module 520 may obtain the third position and the generated image, and map the third position to a corresponding position within a display area 525 of the display device 425. For example, as discussed with regard to FIG. 1, when the third position is the position Z, the display module 520 may map the position Z to a position Z' in the display area 525. The display module 520 may map the determined position to the corresponding position in the display area 525 according to any suitable mapping method.

In embodiments where the second sensor data includes video data, the display module 425 may process the video data according to one of the aforementioned protocols. In some embodiments, the display module 520 may be configured to divide frames of the video data stream into a plurality of tiles. In this regard, the display module 520 may operate in conjunction with one or more hardware devices such as GPU or one or more processors of the processor circuitry 415, to perform the tiling functions. A tile may be an array of pixels or any other like grid in a digital image, such as a video frame. Tile rendering may include dividing a display area into a number of tiles, and rendering each tile separately. In various embodiments, the display module 520 may break the video data into video segments into multiple tiles based on metadata that defines one or more areas of the video data. The metadata defining the one or more areas may be received from the detection module 510 or image generator 515. The display module 520 may determine a tile in which the detected object is located, and provide the determined tile and mapping information to the display device 425 for display. In other embodiments, the display module 520 may divide each frame of the data stream into multiple layers and/or video objects of varying shapes and/or sizes according to the MPEG-4 Advanced Video Coding (AVC) standard. In such embodiments, the display module may determine a video object corresponding to a detected object (e.g., the third vehicle 115) and assemble or reassemble the video object into an output video to be displayed.

Once the display module 520 reassembles the tiles and/or the video objects of the one or more next data steam segments into one or more frames, the display module 520 may provide the reassembled data stream segments to the display device 425 for display. According to various embodiments, the display module 520 may be configured to provide the reassembled and/or decoded data stream segments for display on the display device 425 by, for example, converting the data stream segments into a form that is suitable for display on the display device 425.

As shown in FIG. 4, the v. assist app 500 may comprise each of the detection module 510, the device interface module 505, the display module 520, and the display module 520. However, according to various embodiments, additional modules may be present and/or the aforementioned modules may be combined or divided into other logical components.

FIG. 6 is a flowchart illustrating an example process 600 of the v. assist app 500, in accordance with various embodiments. For illustrative purposes, the operations of process 600 will be described as being performed by the computing device 400 utilizing the various components and modules, as described with respect to FIGS. 4-5. Further, the operations of process 600 will be described as being performed when the computing device 400 is operated by the first vehicle operator of the first vehicle 105 discussed with regard FIG. 1. However, it should be noted that other similar devices may operate the process 600 as described below. While particular examples and orders of operations are illustrated in FIG. 6, in various embodiments, these operations may be re-ordered, broken into additional operations, combined, and/or omitted altogether.

Referring to FIG. 6, at operation 605, the device interface module 505 of the computing device 400 may obtain first sensor data from sensor 550. In various embodiments, the detection module 510 and/or the device interface module 505 may poll the sensor 550 on a periodic basis to obtain the first sensor data. In other embodiments, the sensor 550 may be triggered by some event, which may indicate that the sensor 550 is to provide the first sensor data to the device interface module 505. Such events may include receiving a user request to obtain sensor data, initiating a braking system of the first vehicle 105, a sudden movement of a steering wheel of the first vehicle 105, reception of a broadcast of basic safety messages (BSM) or other like trigger message from an external computing device, and/or the like.

At operation 610, the detection module 510 of the computing device 400 may determine, based on the first sensor data, whether an object is proximate to the first vehicle 105. If at operation 620, the detection module 510 of the computing device 400 determines that an object is not proximate to the first vehicle 105, then the computing device 400 may proceed to operation 605 to obtain more first sensor data. If at operation 620, the detection module 510 of the computing device 400 determines that an object is proximate to the first vehicle 105, then the computing device 400 may proceed to operation 615 to determine a first position based on the first sensor data.

At operation 615, the detection module 510 of the computing device 400 may determine a first position based on the first sensor data. The first position may be a position of the first vehicle 105 relative to the detected object. At operation 620, the detection module 510 of the computing device 400 may determine whether the first position is within a threshold distance for a desired period of time. The threshold distance may be a predefined distance or a dynamically adjusted distance. The threshold distance may be adjusted based on various criteria, such as demographic information associated with the first operator, vehicle characteristics of the first vehicle (e.g., vehicle type, size, age, wear and tear of certain vehicle components, etc.), and/or any other suitable criteria. Similarly, the desired period of time may be a predefined period of time, or the desired period of time may be dynamically adjusted based on the same or similar criteria discussed previously.

If at operation 620 the detection module 510 of the computing device 400 determines that the first position is not within the threshold for the desired period of time, the computing device 400 may proceed to operation 605 to obtain more first sensor data. If at operation 620 the detection module 510 of the computing device 400 determines that the first position is not within the threshold for the desired period of time, the computing device 400 may proceed to operation 625 to determine whether the detected object is another vehicle or not.

At operation 625, the detection module 510 of the computing device 400 may determine whether the detected object is another vehicle or not. In various embodiments, the detection module 510 of the computing device 400 may utilize any suitable object recognition application or algorithm to determine if the detected object is another vehicle. The object may be another vehicle, such as second vehicle 110, or the object may be debris, a pedestrian, or some other object. If at operation 625 the detection module 510 of the computing device 400 determines that the detected object is not another vehicle, the computing device 400 may proceed to operation 655 to generate one or more images of the detected object. For example, if at operation 625 the detection module 510 of the computing device 400 determines that the detected object is a pedestrian, then at operation 655 the image generator 515 may generate an image that is representative of the pedestrian. If at operation 625 the detection module 510 of the computing device 400 determines that the detected object is another vehicle, the computing device 400 may proceed to operation 630 to initiate a V2V communication session via the baseband circuitry 410 and the RF circuitry 405 according to suitable V2X protocols. In the event that the detect vehicle is not capable of engaging in a V2V communication session, or the detected vehicle is unable to engage in a V2V communication session, the computing device 400 may end the process 600 or may proceed to operation 605 to obtain first sensor data (not shown).

When a V2V communication session is established, at operation 635, the computing device 400 may obtain second sensor data from a second sensor of the detected vehicle (e.g., second vehicle 110). At operation 640, the detection module 510 of the computing device 400 may determine, based on the second sensor data, whether an object is present in the second sensor data. The detection module 510 of the computing device 400 may utilize an object detection application or algorithm to detect an object in the second sensor data. If at operation 640, the detection module 510 of the computing device 400 determines that an object is present in the second sensor data, the computing device 400 may proceed to operation 645 to determine a second position based on the second sensor data. The second position may be a position of vehicle detected at operation 625 (e.g., the second vehicle 110) relative to the object detected at operation 640 (e.g., the third vehicle 115 discussed with regard to FIG. 1).

At operation 650, the detection module 510 of the computing device 400 may determine a third position based on the first position determined at operation 615 and the second position determined at operation 645. In some embodiments, the detection module 510 of the computing device 400 may combine the first position and the second position, including performing algebraic and trigonometric calculations to determine the third position. Additionally, in some embodiments, the detection module 510 may estimate a length of the second vehicle 110 based on the object detection application/algorithm used at operation 610. In such embodiments, the detection module 510 may take the estimated length into account when determining the third position. In other embodiments, the detection module 510 of the computing device 400 may use a known GPS coordinate of the first vehicle 105, and use the second position to determine an offset between the first vehicle 105 and the third vehicle 115. The detection module 510 may use any other suitable method to determine the third position.

At operation 655, the image generator 515 of the computing device may generate one or more images to be displayed. The one or more images may be based on the object detected 625 (e.g., a pedestrian, debris, and the like) or operation 640 (e.g., the third vehicle 115). At operation 660, the display module 520 of the computing device 400 provides the generate one or more images to be displayed in a display device 425. In various embodiments, the display module 520 may map the determined third position to a corresponding position in a display area 525 of a display device 425

Some non-limiting Examples are provided below.

Example 1 may include a computing device for assisting a first vehicle, the computing device comprising: device interface circuitry associated with the first vehicle to obtain first sensor data from a sensor, wherein the first sensor data is representative of a second vehicle proximate to the first vehicle; and a detection module, associated with the first vehicle, to be operated by at least one processor, the detection module to obtain the first sensor data from the device interface circuitry; determine based on the first sensor data, a position of the second vehicle relative to the first vehicle; in response to a determination of the position, initiate a vehicle-to-vehicle (V2V) communications session with the second vehicle; and receive second sensor data from the second vehicle during the V2V communications session.

Example 2 may include the computing device of example 1 and/or some other examples herein, wherein the detection module is to poll, on a periodic basis, the sensor via the device interface circuitry to obtain the first sensor data.

Example 3 may include the computing device of example 1 and/or some other examples herein, wherein the detection module is to determine, based on the position, whether the second vehicle is within a threshold distance from the first vehicle.

Example 4 may include the computing device of example 3 and/or some other examples herein, wherein the detection module is to dynamically adjust the threshold distance based on a size of the second vehicle and a field of view of the sensor.

Example 5 may include the computing device of example 3 and/or some other examples herein, wherein the detection module is to determine whether the second vehicle is within the threshold distance from the first vehicle for a desired period of time, and detection module is to initiate the V2V communications session when the detection module determines that the second vehicle is within the threshold distance from the first vehicle for the desired period of time.

Example 6 may include the computing device of example 1 and/or some other examples herein, wherein the sensor is a first sensor, and the second sensor data is to be captured by a second sensor on or in the second vehicle, and wherein the second sensor data are raw data captured by the second sensor.

Example 7 may include the computing device of any one of examples 1-6 and/or some other examples herein, wherein the sensor is a first sensor and the position is a first position, and wherein the detection module is to obtain the second sensor data from a second sensor on or in the second vehicle or obtain position data based on a second position of a third vehicle relative to the second vehicle derived based on the second sensor data, and the computing device further comprises: an image generator to be operated by the at least one processor, the image generator to obtain the second sensor data or the position data associated with the second position of the third vehicle, and generate one or more images based on the second sensor data or the position data associated with the second position of the third vehicle; and a display module to be operated by the at least one processor, the display module to provide the one or more images to be displayed in a display device of the first vehicle.

Example 8 may include the computing device of example 7 and/or some other examples herein, wherein the display device is a head-up display (HUD) integrated into a windshield of the first vehicle.

Example 9 may include the computing device of example 7 and/or some other examples herein, wherein the first sensor is arranged in the first vehicle such that a field of view of the first sensor is in front of the first vehicle, and the second sensor is arranged in the second vehicle such that a field of view of the second sensor is in front of the second vehicle.

Example 10 may include the computing device of example 9 and/or some other examples herein, wherein the device interface module is to obtain the first sensor data from the first sensor during operation of the first vehicle.

Example 11 may include the computing device of example 9 and/or some other examples herein, wherein the second sensor data is representative of at least the third vehicle to be detected by the second sensor, and wherein on receipt of the second sensor data, the detection module is to determine, based on the second sensor data, the second position of the third vehicle relative to the second vehicle, and the detection module is to further determine, based on the second position, a third position wherein the third position is a position of the third vehicle relative to the first vehicle.

Example 12 may include the computing device of example 11 and/or some other examples herein, wherein to determine the third position the detection module is to combine the first position with the second position.

Example 13 may include the computing device of example 11 and/or some other examples herein, wherein to generate the one or more images, the image generator is to generate an image representative of the third vehicle, and the display module is to map the third position to a corresponding region of the display device such that the image representative of the third vehicle is to be displayed in the corresponding region.

Example 14 may include the computing device of example 1 and/or some other examples herein, wherein the sensor is a first sensor and the position is a first position, and wherein the detection module is to obtain the second sensor data from a second sensor on or in the second vehicle and obtain third sensor data from a third sensor on or in a third vehicle, detect an object based on the second sensor data and the third sensor data, and the computing device further comprises: an image generator to be operated by the at least one processor, the image generator to obtain the second sensor data and the third sensor data, generate an image representative of the detected object based at least one the second sensor data and the third sensor data, and update a three-dimensional (3D) model to include the generated image; and a display module to be operated by the at least one processor, the display module to provide the image to be overlaid on the 3D model for display in a display device of the first vehicle.

Example 15 may include the computing device of any one of examples 1-14 and/or some other examples herein, wherein the first vehicle includes the computing device, the first sensor, radio frequency (RF) circuitry, and baseband circuitry, wherein the baseband circuitry is coupled with the RF circuitry to: initiate the V2V communications session with the second vehicle, and receive the second sensor data from the second vehicle during the V2V communications session; initiate another V2V communications session with the third vehicle, and receive the third sensor data from the third vehicle during the other V2V communications session; and initiate a vehicle-to-infrastructure (V2I) communications session with a service provider, and provide the updated 3D model to the service provider during the V2I communications session.

Example 16 may include a method for assisting a first vehicle, the method comprising: obtaining, by a first computing device associated with the first vehicle, first sensor data from a sensor on or in the first vehicle, wherein the first sensor data is representative of a second vehicle proximate to the first vehicle; determining, by the first computing device, based on the first sensor data, a first position of the second vehicle relative to the first vehicle; initiating, by the first computing device, a vehicle-to-vehicle (V2V) communications session with the second vehicle; receiving, by the first computing device, second sensor data from the second vehicle during the V2V communications session; determining, by the first computing device, a second position based on the second sensor data, wherein the second position is a position of the second vehicle relative to a third vehicle detected by a second sensor of the second vehicle; and displaying, by the first computing device, an image representative of the third vehicle on a display device associated with the computing device.

Example 17 may include the method of example 16 and/or some other examples herein, further comprising: polling, by the first computing device, the sensor on a periodic basis to obtain the first sensor data.

Example 18 may include the method of example 16 and/or some other examples herein, further comprising: determining, by the first computing device, based on the position, whether the second vehicle is within a threshold distance from the first vehicle.

Example 19 may include the method of example 18 and/or some other examples herein, further comprising: dynamically adjusting, by the first computing device, the threshold distance based on a size of the second vehicle and a field of view of the sensor.

Example 20 may include the method of example 18 and/or some other examples herein, further comprising: determining, by the first computing device, whether the second vehicle is within the threshold distance from the first vehicle for a desired period of time, and wherein initiating includes initiating the V2V communications session when the second vehicle is determined to be within the threshold distance from the first vehicle for the desired period of time.

Example 21 may include the method of example 16 and/or some other examples herein, wherein the sensor is a first sensor, and the second sensor data is captured by a second sensor on or in the second vehicle, and wherein the second sensor data are raw data captured by the second sensor.

Example 22 may include the method of any one of examples 16-20 and/or some other examples herein, wherein the sensor is a first sensor and the position is a first position, and the method further comprises: obtaining, by the first computing device, the second sensor data from a second sensor on or in the second vehicle or obtain position data based on a second position of a third vehicle relative to the second vehicle derived based on the second sensor data; generating, by the first computing device, one or more images based on the second sensor data or the position data associated with the second position of the third vehicle; and providing, by the first computing device, the one or more images to be displayed in a display device of the first vehicle.

Example 23 may include the method of example 21 and/or some other examples herein, wherein the display device is a head-up display (HUD) integrated into a windshield of the first vehicle.

Example 24 may include the method of example 21 and/or some other examples herein, wherein the first sensor is arranged in the first vehicle such that a field of view of the first sensor is in front of the first vehicle, and the second sensor is arranged in the second vehicle such that a field of view of the second sensor is in front of the second vehicle.

Example 25 may include the method of example 24 and/or some other examples herein, wherein the obtain the first sensor data from the first sensor is accomplished during operation of the first vehicle.

Example 26 may include the method of example 24 and/or some other examples herein, wherein the second sensor data is representative of at least the third vehicle to be detected by the second sensor, and wherein on receipt of the second sensor data, and the method comprises: determining, by the first computing device, based on the second sensor data, the second position of the third vehicle relative to the second vehicle; and determining, by the first computing device, based on the second position, a third position wherein the third position is a position of the third vehicle relative to the first vehicle.

Example 27 may include the method of example 26 and/or some other examples herein, wherein the determining the third position comprises: combining, by the first computing device, the first position with the second position.

Example 28 may include the method of example 26 and/or some other examples herein, wherein displaying the image includes mapping the third position to a corresponding region of a display device such that the image representative of the third vehicle is to be displayed in the corresponding region.

Example 29 may include the method of example 16 and/or some other examples herein, wherein the sensor is a first sensor and the position is a first position, and the method further comprises: obtaining, by the first computing device, the second sensor data from a second sensor on or in the second vehicle and obtain third sensor data from a third sensor on or in a third vehicle; detecting, by the first computing device, an object based on the second sensor data and the third sensor data; generating, by the first computing device, an image representative of the detected object; updating, by the first computing device, a three-dimensional (3D) model to include the generated image; and providing, by the first computing device, the image to be overlaid on the 3D model for display in a display device of the first vehicle.

Example 30 may include the method of any one of examples 16-29 and/or some other examples herein, further comprising: initiating, by the first computing device, the V2V communications session with the second vehicle, and receiving, by the first computing device, the second sensor data from the second vehicle during the V2V communications session; initiating, by the first computing device, another V2V communications session with the third vehicle, and receiving, by the first computing device, the third sensor data from the third vehicle during the other V2V communications session; and initiating, by the first computing device, a V2I communications session with a service provider, and providing, by the first computing device, the updated 3D model to the service provider during the V2I communications session.

Example 31 may include the least one computer-readable medium including instructions that, when executed by one or more processors of a computing device associated with a first vehicle, cause the computing device to execute the method of any one of examples 16-30 and/or some other examples herein. The at least one computer-readable medium may be a non-transitory computer-readable medium.

Example 32 may include at least one computer-readable medium including instructions that, when executed by one or more processors of a computing device associated with a first vehicle, cause the computing device to: obtain first sensor data from a sensor on or in the first vehicle, wherein the first sensor data is representative of a second vehicle proximate to the first vehicle; determine based on the first sensor data, a first position of the second vehicle relative to the first vehicle; initiate a vehicle-to-vehicle (V2V) communications session with the second vehicle; receive second sensor data from the second vehicle during the V2V communications session; determine a second position based on the second sensor data, wherein the second position is a position of the second vehicle relative to a third vehicle detected by a second sensor of the second vehicle; and display an image representative of the third vehicle on a display device associated with the computing device. The at least one computer-readable medium may be a non-transitory computer-readable medium.

Example 33 may include the at least one computer-readable medium of example 32 and/or some other examples herein, wherein the instructions, when executed by the one or more processors, cause the computing device to poll the sensor on a periodic basis to obtain the first sensor data.

Example 34 may include the at least one computer-readable medium of example 32 and/or some other examples herein, wherein the instructions, when executed by the one or more processors, cause the computing device to: determine, based on the position, whether the second vehicle is within a threshold distance from the first vehicle.

Example 35 may include the at least one computer-readable medium of example 34 and/or some other examples herein, wherein the instructions, when executed by the one or more processors, cause the computing device to dynamically adjust the threshold distance based on a size of the second vehicle and a field of view of the sensor.

Example 36 may include the at least one computer-readable medium of example 34 and/or some other examples herein, wherein the instructions, when executed by the one or more processors, cause the computing device to: determine whether the second vehicle is within the threshold distance from the first vehicle for a desired period of time, and wherein the instructions, when executed by the one or more processors, cause the computing device to initiate the V2V communications session when the second vehicle is determined to be within the threshold distance from the first vehicle for the desired period of time.

Example 37 may include the at least one computer-readable medium of example 32 and/or some other examples herein, wherein the sensor is a first sensor, and the second sensor data is to be captured by a second sensor on or in the second vehicle, and wherein the second sensor data are raw data captured by the second sensor.

Example 38 may include the at least one computer-readable medium of any one of examples 32-36 and/or some other examples herein, wherein the sensor is a first sensor and the position is a first position, and wherein the instructions, when executed by the one or more processors, cause the computing device to: obtain the second sensor data from a second sensor on or in the second vehicle or obtain position data based on a second position of a third vehicle relative to the second vehicle derived based on the second sensor data; generate one or more images based on the second sensor data or the position data associated with the second position of the third vehicle; and provide the one or more images to be displayed in a display device of the first vehicle.

Example 39 may include the at least one computer-readable medium of example 37 and/or some other examples herein, wherein the display device is a head-up display (HUD) integrated into a windshield of the first vehicle.

Example 40 may include the at least one computer-readable medium of example 37 and/or some other examples herein, wherein the first sensor is arranged in the first vehicle such that a field of view of the first sensor is in front of the first vehicle, and the second sensor is arranged in the second vehicle such that a field of view of the second sensor is in front of the second vehicle.

Example 41 may include the at least one computer-readable medium of example 40 and/or some other examples herein, wherein the computing device is to obtain the first sensor data from the first sensor during operation of the first vehicle.

Example 42 may include the at least one computer-readable medium of example 40 and/or some other examples herein, wherein the second sensor data is representative of at least the third vehicle to be detected by the second sensor, and wherein on receipt of the second sensor data, and the instructions, when executed by the one or more processors, cause the computing device to: determine, based on the second sensor data, the second position of the third vehicle relative to the second vehicle; and determine, based on the second position, a third position wherein the third position is a position of the third vehicle relative to the first vehicle.

Example 43 may include the at least one computer-readable medium of example 42 and/or some other examples herein, wherein to determine the third position, the instructions, when executed by the one or more processors, cause the computing device to combine the first position with the second position.

Example 44 may include the at least one computer-readable medium of example 42, wherein to display the image, the instructions, when executed by the one or more processors, cause the computing device to map the third position to a corresponding region of a display device such that the image representative of the third vehicle is to be displayed in the corresponding region.

Example 45 may include the at least one computer-readable medium of example 32 and/or some other examples herein, wherein the sensor is a first sensor and the position is a first position, and wherein the instructions, when executed by the one or more processors, cause the computing device to: obtain the second sensor data from a second sensor on or in the second vehicle and obtain third sensor data from a third sensor on or in a third vehicle; detect an object based at least one on the second sensor data and the third sensor data; generate an image representative of the detected object; update a three-dimensional (3D) model to include the generated image; and provide the image to be overlaid on the 3D model for display in a display device of the first vehicle.

Example 46 may include the at least one computer-readable medium of any one of examples 32-45 and/or some other examples herein, wherein the instructions, when executed by the one or more processors, cause the computing device to: initiate the V2V communications session with the second vehicle, and receive the second sensor data from the second vehicle during the V2V communications session; initiate another V2V communications session with the third vehicle, and receive the third sensor data from the third vehicle during the other V2V communications session; and initiate a V2I communications session with a service provider, and provide the updated 3D model to the service provider during the V2I communications session.

Example 47 may include a computing device for assisting a first vehicle, the computing device comprising: device interface means for obtaining first object presence data from sensing means, wherein the sensing means is for sensing a presence of one or more objects proximate to the first vehicle, and wherein the first object presence data is representative of a second vehicle proximate to the first vehicle; and detection means for determining, based on the first object presence data, a position of the second vehicle relative to the first vehicle; in response to determining the position, initiating a vehicle-to-vehicle (V2V) communications session with the second vehicle; and receiving second object presence data from the second vehicle during the V2V communications session.

Example 48 may include the computing device of example 47 and/or some other examples herein, wherein the detection means is further for polling, on a periodic basis, the sensing means to obtain the first object presence data.

Example 49 may include the computing device of example 47 and/or some other examples herein, wherein the detection means is further for determining, based on the position, whether the second vehicle is within a threshold distance from the first vehicle.

Example 50 may include the computing device of example 49 and/or some other examples herein, wherein the detection means is further for dynamically adjusting the threshold distance based on a size of the second vehicle and a field of view of the sensor.

Example 51 may include the computing device of example 49 and/or some other examples herein, wherein the detection means is further for determining whether the second vehicle is within the threshold distance from the first vehicle for a desired period of time, and the detection means is further for initiating the V2V communications session when the detection means determines that the second vehicle is within the threshold distance from the first vehicle for the desired period of time.

Example 52 may include the computing device of example 47 and/or some other examples herein, wherein the sensing means is a first sensing means, and the second object presence data is to be captured by second sensing means associated with the second vehicle, and wherein the second sensing means is for sensing objects proximate to the second vehicle.

Example 53 may include the computing device of any one of examples 47-52 and/or some other examples herein, wherein the sensing means is a first sensing means and the position is a first position, and wherein the detection means is further for obtaining the second object presence data from second sensing means on or in the second vehicle or obtain position data based on a second position of a third vehicle relative to the second vehicle derived based on the second object presence data, and the computing device further comprises: image generation means for obtaining the second object presence data or the position data associated with the second position of the third vehicle, and generating one or more images based on the second object presence data or the position data associated with the second position of the third vehicle; and display means for providing the one or more images to be displayed in a display device of the first vehicle.

Example 54 may include the computing device of example 53 and/or some other examples herein, wherein the display device is a head-up display (HUD) integrated into a windshield of the first vehicle.

Example 55 may include the computing device of example 53 and/or some other examples herein, wherein the first sensing means is arranged in the first vehicle such that a field of view of the first sensing means is in front of the first vehicle, and the second sensing means is arranged in the second vehicle such that a field of view of the second sensing means is in front of the second vehicle.

Example 56 may include the computing device of example 55 and/or some other examples herein, wherein the device interface means is for obtaining the first object presence data from the first sensing means during operation of the first vehicle.

Example 57 may include the computing device of example 55 and/or some other examples herein, wherein the second sensor data is representative of at least the third vehicle to be detected by the second sensing means, and wherein on receipt of the second object presence data, the detection means is for determining, based on the second object presence data, the second position of the third vehicle relative to the second vehicle, and the detection means is further for determining, based on the second position, a third position wherein the third position is a position of the third vehicle relative to the first vehicle.

Example 58 may include the computing device of example 57 and/or some other examples herein, wherein to determine the third position the detection means combines the first position with the second position.

Example 59 may include the computing device of example 57 and/or some other examples herein, wherein to generate the one or more images, the image generation means is for generating an image representative of the third vehicle, and the display means is for mapping the third position to a corresponding region of the display device such that the image representative of the third vehicle is displayed in the corresponding region.

Example 60 may include the computing device of example 47 and/or some other examples herein, wherein the sensing means is a first sensing means and the position is a first position, and wherein the detection means is for obtaining the second object presence data from second sensing means on or in the second vehicle and for obtaining third object presence data from third sensing means on or in a third vehicle, for detecting an object based on the second object presence data and the third object presence data, and the computing device further comprises: image generation means for generating an image representative of the detected object based on the first object presence data, the second object presence data, and the third object presence data; and for updating a three-dimensional (3D) model to include the generated image; and display means for providing the image to be overlaid on the 3D model for display in a display device of the first vehicle.

Example 61 may include the computing device of any one of examples 47-60 and/or some other examples herein, wherein the first vehicle includes the computing device, the first sensing means, and communication means, wherein the communication means is for: initiating the V2V communications session with the second vehicle, and for receiving the second sensor data from the second vehicle during the V2V communications session; initiating another V2V communications session with the third vehicle, and for receiving the third sensor data from the third vehicle during the other V2V communications session; and initiating a V2I communications session with a service provider, and for providing the updated 3D model to the service provider during the V2I communications session.

Example 62 may include a computing device for assisting a first vehicle, the computing device comprising: device interface circuitry on or in a second vehicle to obtain sensor data from a sensor associated with the second vehicle, wherein the sensor data is representative of a third vehicle that is to approach the second vehicle in an opposite direction of travel; and a detection module to be operated by at least one processor on or in the second vehicle, the detection module to obtain from the device interface circuitry, the sensor data, determine based on the sensor data, a position of the third vehicle relative to the second vehicle; and provide the sensor data or position data associated with the position of the third vehicle to the first vehicle during a vehicle-to-vehicle (V2V) communications session with the first vehicle.

Example 63 may include the computing device of example 62 and/or some other examples herein, wherein computing device includes radio frequency (RF) circuitry to receive a message that is to initiate the V2V communications session, and the detection module is to provide, via the RF circuitry, the sensor data to the first vehicle in response to receipt of the message.

Example 64 may include the computing device of example 62 and/or some other examples herein, wherein the first vehicle is to travel in a same direction of travel as the second vehicle and the second vehicle is to travel in front of the first vehicle.

Example 65 may include a method for assisting a first vehicle, the method comprising: obtaining, by a computing device, sensor data from a sensor associated with a second vehicle, wherein the sensor data is representative of a third vehicle that is to approach the second vehicle in an opposite direction of travel; and providing, by the computing device, the sensor data or position data associated with the position of the third vehicle to the first vehicle during a vehicle-to-vehicle (V2V) communications session with the first vehicle.

Example 66 may include the method of example 65 and/or some other examples herein, further comprising: determining, by the computing device, based on the sensor data, a position of the third vehicle relative to the second vehicle.

Example 67 may include the method of example 65 and/or some other examples herein, further comprising: receiving, by the computing device, a message that is to initiate the V2V communications session between the second vehicle and the first vehicle; and providing, by the computing device, the sensor data to the first vehicle in response to receipt of the message.

Example 68 may include the method of example 65 and/or some other examples herein, wherein the first vehicle is to travel in a same direction of travel as the second vehicle and the second vehicle is to travel in front of the first vehicle.

Example 68.5 may include at least one computer-readable medium including instructions that, when executed by one or more processors of a computing device associated with a first vehicle, cause the computing device to execute the method of any one of examples 65-68 and/or some other examples herein. The at least one computer-readable medium may be a non-transitory computer-readable medium.

Example 69 may include at least one computer-readable medium including instructions that, when executed by one or more processors of a computing device associated with a first vehicle, cause the computing device to: obtain sensor data from a sensor associated with a second vehicle, wherein the sensor data is representative of a third vehicle that is to approach the second vehicle in an opposite direction of travel; and provide the sensor data or position data associated with the position of the third vehicle to the first vehicle during a vehicle-to-vehicle (V2V) communications session with the first vehicle. The at least one computer-readable medium may be a non-transitory computer-readable medium.

Example 70 may include the at least one computer-readable medium example 69 and/or some other examples herein, wherein the instructions, when executed by the one or more processors, cause the computing device to: determine based on the sensor data, a position of the third vehicle relative to the second vehicle.

Example 71 may include the at least one computer-readable medium example 69 and/or some other examples herein, wherein the instructions, when executed by the one or more processors, cause the computing device to: receive a message that is to initiate the V2V communications session between the second vehicle and the first vehicle; and provide the sensor data to the first vehicle in response to receipt of the message.

Example 72 may include the method of example 69 and/or some other examples herein, wherein the first vehicle is to travel in a same direction of travel as the second vehicle and the second vehicle is to travel in front of the first vehicle.

Example 73 may include a computing device for assisting a first vehicle, the computing device comprising: device interface means for obtaining object presence data from a sensing means associated with the second vehicle, wherein the sensing means is for sensing a presence of one or more objects proximate to the first vehicle, and wherein the object presence data is representative of a third vehicle that is to approach the second vehicle in an opposite direction of travel; and detection means for determining, based on the object presence data, a position of the third vehicle relative to the second vehicle; and provide the object presence data or position data associated with the position of the third vehicle to the first vehicle during a vehicle-to-vehicle (V2V) communications session with the first vehicle.

Example 74 may include the computing device of example 73 and/or some other examples herein, wherein computing device includes communication means to receive a message that is to initiate the V2V communications session, and the detection means is to provide, via the communication means, the object presence data to the first vehicle in response to receipt of the message.

Example 75 may include the computing device of example 73 and/or some other examples herein, wherein the first vehicle is to travel in a same direction of travel as the second vehicle and the second vehicle is to travel in front of the first vehicle.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

I claim:

1. A computer device for assisting a first vehicle, the computer device comprising:
  device interface circuitry to obtain first sensor data from a first sensor in or on the first vehicle, wherein the first sensor data is representative of a second vehicle proximate to the first vehicle; and
  a detection module to be operated by at least one processor, the detection module to:
    obtain the first sensor data from the device interface circuitry;
    determine, based on the first sensor data, a first position of the second vehicle relative to the first vehicle;
    in response to a determination of the first position, initiate a vehicle-to-vehicle (V2V) communications session with the second vehicle; and
    receive second sensor data from the second vehicle during the V2V communications session, wherein the second sensor data is to be captured by a second sensor on or in the second vehicle, and the second sensor data is representative of an object that is a potential obstacle with respect to the first vehicle, and wherein on receipt of the second sensor data, the detection module is to:

determine, based on the second sensor data, a second position of the object relative to the second vehicle, and determine, based on the second position, a third position of the object relative to the first vehicle.

2. The computer device of claim 1, wherein the detection module is to poll, on a periodic basis, the first sensor via the device interface circuitry to obtain the first sensor data.

3. The computer device of claim 1, wherein the detection module is to determine, based on the first position, whether the second vehicle is within a threshold distance from the first vehicle.

4. The computer device of claim 3, wherein the detection module is to dynamically adjust the threshold distance based on a size of the second vehicle and a field of view of the first sensor.

5. The computer device of claim 3, wherein the detection module is to determine whether the second vehicle is within the threshold distance from the first vehicle for a desired period of time, and the detection module is to initiate the V2V communications session when the detection module determines that the second vehicle is within the threshold distance from the first vehicle for the desired period of time.

6. The computer device of claim 1, wherein the second sensor data are raw data captured by the second sensor.

7. The computer device of claim 1, wherein the object that is a potential obstacle with respect to the first vehicle is a third vehicle that is different than the first vehicle and the second vehicle, and the computer device further comprises:

an image generator, to be operated by the at least one processor, the image generator to obtain the second sensor data or position data associated with the second position of the third vehicle, and generate one or more images based on the second sensor data or the position data associated with the second position of the third vehicle; and a display module, to be operated by the at least one processor, the display module to provide the one or more images to be displayed in a display device of the first vehicle.

8. The computer device of claim 7, wherein the display device is a head-up display (HUD) integrated into a windshield of the first vehicle.

9. The computer device of claim 7, wherein the first sensor is arranged in the first vehicle such that a field of view of the first sensor is in front of the first vehicle, and the second sensor is arranged in the second vehicle such that a field of view of the second sensor is in front of the second vehicle.

10. The computer device of claim 1, wherein the device interface circuitry is to obtain the first sensor data from the first sensor during operation of the first vehicle.

11. The computer device of claim 1, wherein to determine the third position the detection module is to combine the first position with the second position.

12. The computer device of claim 1, wherein to generate one or more images, an image generator is to generate an image representative of the object, and a display module is to map the third position to a corresponding region of a display device such that the image representative of the object is to be displayed in the corresponding region.

13. The computer device of claim 1, wherein the first vehicle includes the computer device, the first sensor, radio frequency (RF) circuitry, and baseband circuitry, wherein the baseband circuitry is coupled with the RF circuitry to initiate the V2V communications session with the second vehicle, and receive the second sensor data from the second vehicle during the V2V communications session.

14. A computer device for assisting a first vehicle, the computer device comprising:

device interface circuitry to obtain first sensor data from a sensor in or on the first vehicle, wherein the first sensor data is representative of a second vehicle proximate to the first vehicle; and a detection module to be operated by at least one processor, the detection module to:

obtain the first sensor data from the device interface circuitry;

determine, based on the first sensor data, a position of the second vehicle relative to the first vehicle;

determine, based on the position, whether the second vehicle is within a threshold distance from the first vehicle;

dynamically adjust the threshold distance based on a size of the second vehicle and a field of view of the sensor;

in response to a determination of the position, initiate a vehicle-to-vehicle (V2V) communications session with the second vehicle; and receive second sensor data from the second vehicle during the V2V communications session.

15. The computer device of claim 14, wherein the detection module is to poll, on a periodic basis, the sensor via the device interface circuitry to obtain the first sensor data.

16. The computer device of claim 14, wherein the detection module is to:

determine whether the second vehicle is within the threshold distance from the first vehicle for a desired period of time; and initiate the V2V communications session when the second vehicle is within the threshold distance from the first vehicle for the desired period of time.

17. The computer device of claim 14, wherein the sensor is a first sensor, and the second sensor data is to be captured by a second sensor on or in the second vehicle, and wherein the second sensor data are raw data captured by the second sensor.

18. The computer device of claim 14, wherein the sensor is a first sensor and the position is a first position, and wherein the detection module is to obtain the second sensor data from a second sensor on or in the second vehicle or obtain position data based on a second position of an object relative to the second vehicle derived based on the second sensor data, wherein the object is a potential obstacle with respect to the first vehicle, and the computer device further comprises:

an image generator, to be operated by the at least one processor, the image generator to obtain the second sensor data or the position data associated with the second position of the object, and generate one or more images based on the second sensor data or the position data associated with the second position of the object; and a display module, to be operated by the at least one processor, the display module to provide the one or more images to be displayed in a display device of the first vehicle.

19. The computer device of claim 14, wherein the sensor is a first sensor, and the first vehicle comprises:
the computer device;
the first sensor;
radio frequency (RF) circuitry;
baseband circuitry communicatively coupled with the RF circuitry to initiate the V2V communications session with the second vehicle, and receive the second sensor data from the second vehicle during the V2V communications session; and
a head-up display (HUD) device integrated into a windshield of the first vehicle and communicatively coupled with the computer device.

20. The computer device of claim 18, wherein the first sensor is arranged in the first vehicle such that a field of view of the first sensor is in front of the first vehicle, and the second sensor is arranged in the second vehicle such that a field of view of the second sensor is in front of the second vehicle, and wherein the device interface circuitry is to obtain the first sensor data from the first sensor during operation of the first vehicle.

21. The computer device of claim 20, wherein the second sensor data is representative of at least the object to be detected by the second sensor, and wherein on receipt of the second sensor data, the detection module is to determine, based on the second sensor data, the second position of the object relative to the second vehicle, and the detection module is to further determine, based on the second position, a third position wherein the third position is a position of the object relative to the first vehicle, and wherein to determine the third position the detection module is to combine the first position with the second position.

22. The computer device of claim 21, wherein to generate the one or more images, the image generator is to generate an image representative of the object, and the display module is to map the third position to a corresponding region of the display device such that the image representative of the object is to be displayed in the corresponding region.

23. The computer device of claim 22, wherein the object is a third vehicle that is different than the first vehicle and different than the second vehicle.

24. A first vehicle comprising:
a head-up display (HUD) device;
a computer device comprising processor circuitry, memory circuitry, and device interface circuitry; and
a system on chip (SoC) communicatively coupled with radio frequency (RF) circuitry, the SoC comprising baseband circuitry and on-board memory, wherein:
the device interface circuitry is to obtain first sensor data from a first sensor in or on the first vehicle, wherein the first sensor data is representative of a second vehicle proximate to the first vehicle,
the processor circuitry is to execute instructions of a detection module stored by the memory circuitry, the detection module to:
obtain the first sensor data from the device interface circuitry;
obtain second sensor data from a second sensor on or in the second vehicle or obtain position data based on a second position of an object relative to the second vehicle derived based on the second sensor data, wherein the object is a potential obstacle with respect to the first vehicle;
determine, based on the first sensor data, a first position of the second vehicle relative to the first vehicle;
in response to a determination of the first position, trigger the baseband circuitry to initiate a vehicle-to-vehicle (V2V) communications session with the second vehicle via the RF circuitry, and the baseband circuitry to control the RF circuitry to receive the second sensor data from the second vehicle during the V2V communications session;
the processor circuitry to execute instructions of an image generator stored by the memory circuitry, the image generator to:
obtain the second sensor data or the position data associated with the second position of the object; and
generate one or more images based on the second sensor data or the position data associated with the second position of the object; and
the processor circuitry to execute instructions of a display module stored by the memory circuitry, the display module to provide the one or more images to be displayed by the HUD device.

25. The first vehicle of claim 24, wherein the detection module is to:
determine, based on the first position, whether the second vehicle is within a threshold distance from the first vehicle;
dynamically adjust the threshold distance based on a size of the second vehicle and a field of view of the first sensor; and
trigger the baseband circuitry to initiate the V2V communications session when the second vehicle is within the threshold distance from the first vehicle for a desired period of time.

26. The first vehicle of claim 24, wherein the first sensor is arranged in the first vehicle such that a field of view of the first sensor is in front of the first vehicle, and the second sensor is arranged in the second vehicle such that a field of view of the second sensor is in front of the second vehicle, and wherein the object is a third vehicle that is different than the first vehicle and different than the second vehicle.

* * * * *